R. I. BURLINGAME.
ANCHOR FOR ANTISKID CHAINS.
APPLICATION FILED MAR. 2, 1918.
1,279,837.
Patented Sept. 24, 1918.
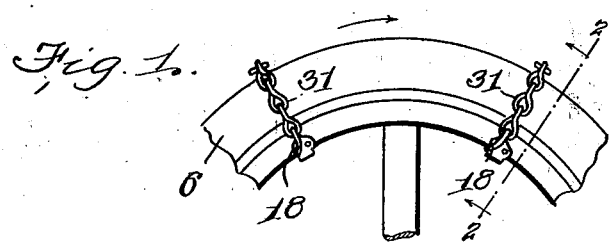
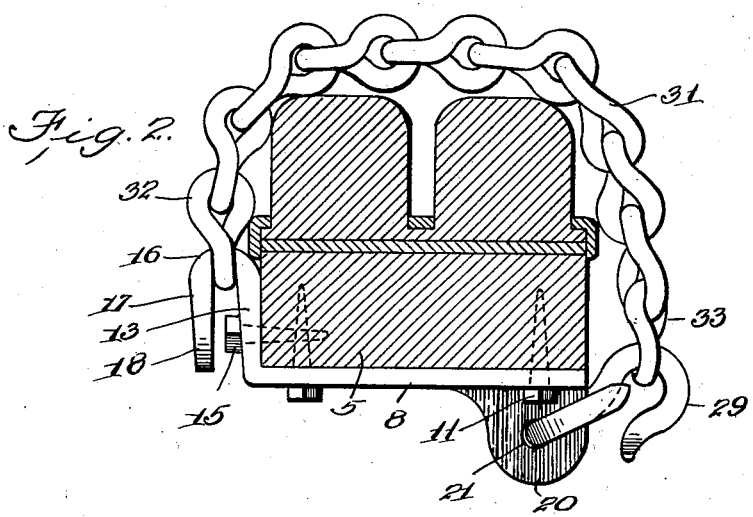
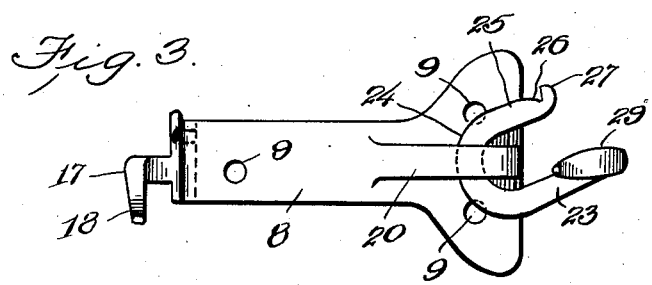
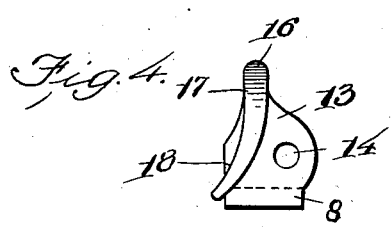
Inventor.
Roland I. Burlingame,
By Horatio E. Bellows,
Attorney.

UNITED STATES PATENT OFFICE.

ROLAND I. BURLINGAME, OF PROVIDENCE, RHODE ISLAND.

ANCHOR FOR ANTISKID-CHAINS.

1,279,837.  Specification of Letters Patent. Patented Sept. 24, 1918.

Application filed March 2, 1918. Serial No. 219,948.

*To all whom it may concern:*

Be it known that I, ROLAND I. BURLINGAME, a citizen of the United States, residing at Providence, in the county of Providence and State of Rhode Island, have invented certain new and useful Improvements in Anchors for Antiskid-Chains, of which the following is a specification.

My invention relates to non skid chains, and particularly to the anchor member thereof adapted for use upon vehicle wheels and more particularly upon motor truck wheels.

The essential objects of my invention are to provide an anchor member adapted to engagement with any particular type of chain whether plain or curbed; to afford means for automatically discharging from the wheel a broken chain length; to facilitate the attachment and detachment of the same from the anchor member; and to attain these ends in a structure secure, simple to construct, and facile to apply.

To the above ends essentially my invention consists in such parts and combinations of parts as fall within the scope of the appended claims.

In the accompanying drawings which form a part of this specification—

Figure 1 is a side elevation of a portion of a vehicle wheel showing my device attached thereto, Fig. 2, a section on line 2—2 of Fig. 1, Fig. 3, a plan view of my anchor plate; and Fig. 4, an end elevation of the same.

Like reference characters indicate like parts throughout the views.

In the drawings 5 represents the wheel felly, and 6 a tire, in this case a dual tread rubber tire, attached thereto in any usual convenient manner.

My anchor is applied to the inner face of the felly, and comprises an oblong flat plate 8 provided with holes 9 adapted to receive attaching screws 11 which enter the felly. At one end the plate 8 is bent at right angles forming a broad shank 13 having a hole 14 to admit an attaching screw 15. Upon the end of the shank is a semicircular bend 16, whence the material of the plate is continued in a plane parallel with the plane of the shank to form a beak 17 which is also transversely inclined as at 18.

Midway of the sides of the plate 8, at one end, is a longitudinally disposed fin or shoulder 20 provided with an opening 21 adapted to loosely admit therethrough a self adjusting chain-attaching member comprising a shank 23 provided at one end with a hook 24 which passes loosely through the opening 21, and has near the extremity of its beak 25 an inclined cut away or beveled portion 26 extending to an exterior or lateral stop lug 27 at the end of the beak. The shank 23 is continued to form a hook 29 disposed in a plane at right angles to the plane of the hook already described.

The parts thus far described are adapted to be engaged with an anti-skid chain of any character. In the present instance the curbed chain 31 embraces the wheel parts and has one terminal link 32 engaged in the hook 17, and the other terminal link 33 engaged in the hook 29.

In applying the chain to my device the link 32 is preferably first engaged with its hook, and then the hook 29 is passed through the link 33; and finally the hook 24 is passed through the opening 21.

The curved portions 24 and 25 of the attaching member permit the chain 31 to automatically adjust itself to varying degrees of looseness, but without danger of accidental escape of the attaching member, because the lug 27 would form a stop against the face of the fin 20.

It will be observed that the beak 18 curves back from the direction in which the wheel is rotating, the motion of the wheel being denoted by the arrow, so that if a chain 31 should break the beak 18 would automatically discharge or throw off the broken section, thus preventing damage to brakes or grease cups.

I claim:—

1. In a device of the character described, the combination of a plate, and a hook comprising a shank upon one end of the plate disposed at right angles thereto, and a laterally inclined beak constructed to automatically discharge from the wheel a broken chain length.

2. In a device of the character described, the combination of a plate, a hook comprising a shank integral with one end of the plate, and a beak inclined transversely to the shank and constructed to automatically discharge from the wheel a broken chain length, and means upon the other end of the plate for engaging a chain.

3. In a device of the character described, the combination of a plate, a hook comprising a shank upon one end of the plate, and a beak parallel with the shank and inclined transversely thereto and constructed to automatically discharge from a wheel a broken chain length, and means upon the other end of the plate for engaging a chain.

4. In a device of the character described, a plate bent at one end at an angle to form a broad shank with an opening, a semi-circular bend at the end of the shank and a beak extending from said bend and transversely inclined to automatically discharge from a wheel a broken chain length.

In testimony whereof I have affixed my signature.

ROLAND I. BURLINGAME.

Copies of this patent may be obtained for five cents each, by addressing the "Commissioner of Patents, Washington, D. C."